Figure 1:
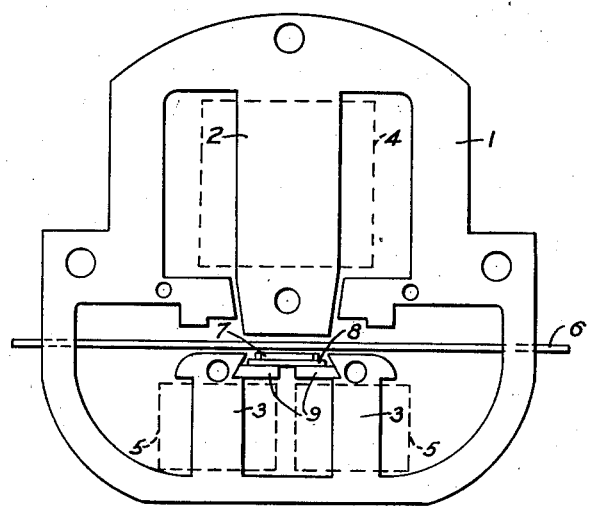

Oct. 14, 1941.  T. D. BARNES  2,259,285

METER

Filed Oct. 12, 1938

WITNESSES:
N. F. Susser.
Mrs. C. Groome

INVENTOR
Thomas D. Barnes.
BY
ATTORNEY

Patented Oct. 14, 1941

2,259,285

UNITED STATES PATENT OFFICE 2,259,285

METER

Thomas D. Barnes, West Orange, N. J., assignor to Westinghouse Electric & Manufacturing Company, East Pittsburgh, Pa., a corporation of Pennsylvania Application October 12, 1938, Serial No. 234,611

3 Claims. (Cl. 171—264)

This invention relates to electrical instruments having magnetic cores, and it has particular relation to magnetic shunts for the magnetic cores of induction type meters.

Induction type instruments designed to be responsive to varying loads have a number of inaccuracies which must be corrected for satisfactory performance. For example, watthour meters of the induction type have an error due to the increase of damping flux from the series or current poles as the load on the meter increases. To compensate for this and other errors, it is the practice at present to employ magnetic shunts for diverting a portion of the magnetic flux passing through the current poles. These magnetic shunts are designed to saturate or operate with decreasing permeability as the flux passing therethrough increases, and the effect of the shunts is to correct the inaccuracies above noted.

Magnetic shunts which have proven to be unusually satisfactory are disclosed in my copending applications Serial No. 144,154, filed May 22, 1937, and Serial No. 204,719, filed April 28, 1938, of which the present application is a continuation in part. These applications are now Patents 2,162,522 and 2,177,274, respectively. In such copending applications the current or series poles of an induction type instrument are provided with extensions for receiving magnetic shunts, the purpose of the extensions being to distribute magnetic flux throughout the shunt with varying densities so that the shunt saturates or operates with decreasing permeability progressively rather than instantaneously. Since these extensions restrict the space between the current poles, it is difficult to insert form-wound current windings therebetween. Consequently, it has been the practice heretofore to employ current windings which are wound on the current poles.

In accordance with the present invention the current or series poles of an induction type instrument are provided with independent extensions which may be inserted in place after current windings have been applied to the current poles. With such an arrangement, the space between the current poles may be left entirely free, thus facilitating the use of form-wound current windings. This invention also contemplates the fabrication of current extensions and a magnetic shunt into a unitary assembly which may be fabricated as a unit and afterwards handled and inserted in final position as a unit.

It is, therefore, an object of my invention to provide an induction type instrument with a magnetic shunt assembly which does not interfere with the construction of the instrument.

It is another object of my invention to provide an induction type instrument with independent extensions for the current poles which may be inserted after the placement of current windings on the current poles.

It is a further object of my invention to provide a magnetic shunt assembly wherein magnetic extensions for the current poles are included in the assembly.

It is a further object of my invention to provide an improved method for fabricating magnetic shunt assemblies.

Figure 2:
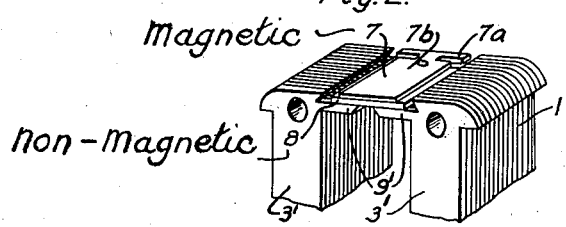
Figure 3:
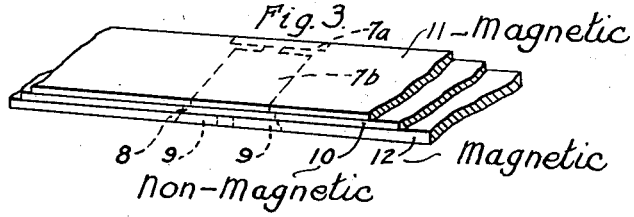

Other objects of my invention will be apparent from the following description taken in conjunction with the accompanying drawing, in which:

Figure 1 is a view in front elevation of an induction meter core embodying my invention, Fig. 2 is a view in perspective with parts broken away of a modification of the construction shown in Fig. 1, and Fig. 3 is a view in perspective of a laminated stock suitable for the fabrication of magnetic shunt assemblies.

Referring to the drawing, Figure 1 shows a well known meter core 1 having a potential pole 2 and current poles 3. Magnetic flux is provided for the meter core by a potential winding 4 placed around the potential pole and current windings 5 placed around the current poles 3, the windings being shown in dotted lines. As is well known in the art, when the potential winding 4 is energized in accordance with the potential of a circuit and the current windings 5 are energized in accordance with the current flowing in the circuit, a shifting magnetic field is created in the air gap between the potential pole 2 and the current poles 3. Such a meter has an electro-conductive disc 6 mounted for rotation through the air gap under the influence of the shifting magnetic field. A meter core of the type herein described is disclosed in the Bradshaw Patent No. 1,181,207.

As heretofore explained, it is customary to provide instruments of the type illustrated in Fig. 1 with shunts for compensating for errors due to series or current pole damping flux and other causes. In the embodiment illustrated in Fig. 1, a shunt 7 is mounted on a non-magnetic spacer 8 which, in turn, is positioned on a pair of magnetic extensions 9. Since this shunt assembly bridges the space between the current poles 3, if it were permanently in place, it would be difficult to insert the current pole windings 5 in the form of form-wound coils. For this reason, the magnetic extensions 9 are constructed independently of the current poles 3 and, after insertion of the current pole windings 5, are mounted in suitable notches provided in the current poles. As shown the notches have inclined walls but other shaped notches may be provided. Although the magnetic shunt 7 may be of any desired design, in the specific embodiment illustrated the shunt comprises two sections 7a and 7b, the section 7a being designed to saturate prior to saturation of the section 7b as taught in my aforesaid application Serial No. 204,719.

For economy of manufacture and to insure stability of the shunt assembly, the shunt assembly may be formed from a laminated stock as illustrated in Fig. 3. The laminated stock is constructed of a non-magnetic intermediate layer 10 such as brass and two outer layers 11, 12 of magnetic material such as iron. These layers may be united by various suitable methods such as riveting or clamping, but preferably they are united by silver soldering, brazing or roll welding. From this laminated sheet a number of shunt assemblies may be punched, cut or otherwise machined. The outlines of a single shunt assembly are shown in dotted lines in Fig. 3. From the upper layer 11, the punching operation would leave the two magnetic shunt sections 7a and 7b; from the intermediate layer 10, a non-magnetic spacer 8 would be formed; and from the lower magnetic layer 12 magnetic extensions 9 would be left by the machining operation. The slots required between the shunt sections 7a, 7b and the extensions 9 may be cut into or through the non-magnetic layer 10 if desired. Since the various parts are solidly united, a tie between the sections 7a and 7b, which is illustrated in Fig. 2, may be omitted if desired from the assembly formed from the laminated stock shown in Fig. 3.

If it is desired to make the magnetic extensions 9 integral with the current poles 3, the remaining elements of the shunt assembly still may be formed in accordance with this invention. Thus in Fig. 2 current poles 3' are provided with integral magnetic extensions 9'. On the magnetic extensions 9' a shunt assembly is placed which includes only the shunt sections 7a, 7b and the non-magnetic spacer 8. Such a shunt assembly would be constructed from a laminated sheet similar to Fig. 3 but including only two layers 10 and 11. By cutting the shunt sections 7a, 7b from the layer 11 and a non-magnetic spacer 8 from the layer 10, a shunt assembly suitable for the modification shown in Fig 2 is provided which is permanently fastened together.

It is believed that the operation of my invention will be apparent from the foregoing description. In constructing an induction type instrument in accordance with this invention, a shunt assembly would be cut from the laminated stock shown in Fig. 3 as above described. Before insertion of this shunt assembly, current pole windings 5 which may be, if desired, form wound are mounted on the current poles 3 of the magnetic core 1. Subsequently the magnetic shunt assembly is inserted in the notches provided in the current poles 3, thereby completing the magnetic core assembly.

Since the magnetic extensions 9 carry a relatively small proportion of the total flux passing through the current poles 3, they may be constructed of solid iron without introducing appreciable losses. However, if it is desired to decrease still further the losses in the magnetic extensions, they may be formed of laminated material. In such a case the layer 12 of Fig. 3 would be a laminated layer of iron.

Although I have described my invention with reference to certain specific embodiments thereof, it is obvious that numerous modifications thereof are possible. Therefore, I do not wish my invention to be restricted except as required by the appended claims when interpreted in view of the prior art.

I claim as my invention:

1. In a shunt assembly, a non-magnetic spacer, a plurality of spaced magnetic members on a first face of said spacer, and a plurality of spaced magnetic shunts on a second face of said spacer for bridging said magnetic members, said spacer, members and shunts being united on their adjacent faces.

2. In a meter, a magnetic core having a pair of spaced magnetic pole members each provided with a notch, a pair of magnetic elements partially bridging the space between said notches, each of said elements having an end positioned in a separate one of said notches, a magnetic shunt bridging said elements, and non-magnetic spacing means for separating said shunt from said elements, said elements, shunt and spacing means being united in a unitary assembly.

3. In a measuring instrument, a magnetic core having spaced pole portions, means for producing magnetic flux in said magnetic core, non-magnetic supporting means extending between said pole portions, magnetic shunt means positioned on one face of said non-magnetic supporting means for shunting magnetic flux between said pole portions, and magnetic extension means on a second face of said non-magnetic supporting means for diverting magnetic flux passing through said magnetic core into said magnetic shunt means, said non-magnetic supporting means, magnetic shunt means and magnetic extension means having adherent metallic connections between their adjacent faces for providing a unit separably associated with said magnetic core.

THOMAS D. BARNES.